United States Patent Office 2,945,884
Patented July 19, 1960

2,945,884

HYDRAZINIUM SALTS

George M. Omietanski, Tonawanda, N.Y., assignor to The Ohio State University Research Foundation, Columbus, Ohio No Drawing. Filed Aug. 7, 1958, Ser. No. 753,633

6 Claims. (Cl. 260—566)

This invention relates to quaternary nitrogenous salts. In one specific aspect, it relates to a class of compounds known as hydrazinium chlorides.

This application pertains to new compositions of matter and is a continuation-in-part of my co-pending application Serial No. 582,657, filed May 4, 1956, and now abandoned, which in turn is a continuation-in-part of application Serial No. 544,091, filed October 31, 1955, now abandoned. The compositions of this invention were not available prior to my discovery.

It is, therefore, an object of the present invention to provide a new generic class of hydrazinium chlorides useful as pharmaceutical intermediates.

In accordance with the present invention, I have made available a class of compounds having the general formula:

(RR'R"NNH$_2$)+Cl−

In the above formula, R is selected from the group consisting of hydroxy lower alkyl, primary amino lower alkyl and arylidene amino lower alkyl radicals. R' and R" are lower alkyl radicals.

The compounds of this invention may be prepared by the action of chloramine on the appropriate tertiary amine; the starting base is usually commercially available. In the preferred practice of my invention, the reactant tertiary amine dissolved in an unreactive solvent is exposed to a stream of gaseous chloramine. The resultant hydrazinium chloride is isolated by conventional laboratory techniques. Other variations are obvious to those skilled in the art. The reaction medium may be aqueous or anhydrous depending on the particular amine to be used as the reactant. In addition, a liquid amine may serve as its own reaction medium. In anhydrous solution, the desired hydrazinium salt often precipitates as the reaction proceeds. If aqueous media are employed, the reaction mixture is concentrated or evaporated to dryness in order to isolate the product. In a slight modifiication of the above procedure, chloramine may be added in a stabilized aqueous solution. See Inorganic Syntheses, vol. I, pp. 59–62, McGraw-Hill, New York (1939).

My invention is further illustrated by the following examples:

Example I

By the process described in U.S. Patent 2,710,248 of Sisler et al., chloramine is prepared by the vapor phase reaction of chlorine and ammonia. A generator was constructed to prepare gaseous mixtures of chloramine, ammonia and nitrogen using this process.

Such a gaseous chloramine-ammonia-nitrogen mixture was bubbled into liquid N,N-dimethylaminoethanol at 25° C. No solid was formed during the reaction, but on chilling the reaction mixture the hydrazinium chloride precipitated as a crystalline mass. The product was recrystallized from an ethanol-ethyl acetate mixture and melted 160–163° C. it was identified as 1,1-dimethyl-1-(2-hydroxyethyl)hydrazinium chloride.

Example II

The gaseous chloramine mixture of the previous example was passed into liquid N,N-diethylaminoethanol. As the reaction proceeded, a paste-like mass formed which was separated from the unreacted amine by decantation. This paste-like product was mixed with ethyl ether resulting in crystallization of a solid and the evolution of ammonia. Because of the hygroscopic nature of the product, 1,1-diethyl-1-(2-hydroxyethyl)hydrazinium chloride, it was converted to the picrate (M.P. 179.5° C.) for analysis. Approximately a 99% yield (based on chloramine used) of the hydrazinium chloride was obtained.

Example III

The gaseous chloramine mixture of Example I was passed into liquid 3-diethylamino-1-propanol at 25° C. giving a moderately exothermic reaction. The resultant solid was collected by filtration and recrystallized from an alcohol-ether mixture to give 1,1-diethyl-1-(3-hydroxypropyl)hydrazinium chloride as a white solid melting 115–116° C.

Example IV

The chloramine-ammonia gas stream prepared as described in Example I was bubbled into liquid N,N-diethyl-N'-benzylidene-ethylenediamine at 25° C. A strongly exothermic reaction occurred and a semi-solid precipitated from the reaction mixture. The product was isolated and identified as the novel 1,1-diethyl-1-(2-benzylideneaminoethyl)hydrazinium chloride.

Example V

The product of the previous example was treated with water. The hydrolysis reaction formed an oil which was separated from the reaction mixture and identified as the novel 1,1-diethyl-1-(2-aminoethyl)hydrazinium chloride.

Example VI

Twenty grams of 3-dimethylaminopropylamine dissolved in 100 ml. of xylene was treated with the gaseous chloramine mixture of Example I. The reaction mixture foamed somewhat and the temperature rose to about 40° C. The oily product was washed with fresh xylene and with heptane. After drying in a vacuum desiccator, 1,1-dimethyl-1-(3-aminopropyl)hydrazinium chloride was a viscous hygroscopic oil which could not be crystallized.

The specific uses of my novel compounds will vary with the nature of their composition, i.e. with the nature of the nitrogen-linked substituents. Both the hydroxy alkyl and amino alkyl compounds are valuable intermediates in the synthesis of pharmaceuticals. For example, acetylation of 1-hydroxyethyl-1-,1-dimethylhydrazinium chloride with acetic anhydride yields an ester; the cation of which Schuler and Hanna reported to be approximately equal to acetylcholine in neural activity. See Archives of International Pharmacodynamics, 88, 351 (1951). The use of polyarylalkanoic acids, such as benzilic acid gave esters which Protiva annd Exner reported were fifty to seventy-five times more potent than the commercial antispasmodic Propivane. They also found that the ethers (obtainable by alkylation of my novel product with benzhydryl halides) were three to five times more effective antihistaminics than Benadryl. See Coll. Czechoslav. Chem. Communs., 19, 531 (1954). Acylation of either my novel hydroxy or amino alkyl derivatives with aroyl halides, e.g. benzoyl chloride, has been found to yield potent anticholinergic compounds. A marked curare-like action has been demonstrated by the highly alkylated amino alkyl hydrazinium chlorides, as suggested in J. Am. Chem. Soc., 74, 2112 (1952).

I have found my primary amino alkyl hydrazinium chlorides to be extremely effective in the purification of naturally occurring water-insoluble carbonyl compounds, such as the steroid ketones. This utility depends on the formation of a water-soluble Schiff base (my benzylidene amino product of Example IV is also a Schiff base) which, on gentle warming with dilute mineral acid, is converted back to water-insoluble ketone and water-soluble dialkylamino alkyl hydrazinium chloride. The Schiff bases claimed in this invention, i.e. those compounds of the general formula $(RR'R''NNH_2)^+Cl^-$ in which R is an arylidene amino alkyl radical, are also useful in the synthesis of pharmaceuticals. For example, the reaction of thioglycolic acid esters with 1,1-dimethyl-1-(2-benzylideneaminoethyl)hydrazinium chloride yield thiazolidones which are anticonvulsants and antispasmodics.

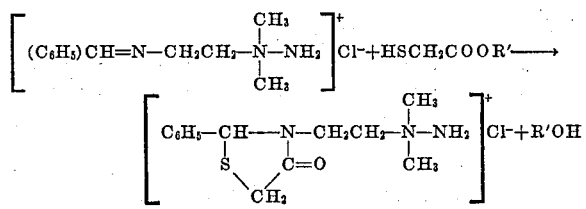

I claim:

1. Compounds having the general formula:

$$(RR'R''NNH_2)^+Cl^-$$

wherein R is a member selected from the group consisting of primary amino lower alkyl and arylidene amino lower alkyl radicals and R' and R'' are lower alkyl radicals.

2. Compounds according to claim 1 wherein R is primary amino lower alkyl.

3. Compounds according to claim 1 wherein R is arylidene amino lower alkyl.

4. 1,1-diethyl-1-(2-aminoethyl)hydrazinium chloride.

5. 1,1 - dimethyl-1-(3-aminopropyl)hydrazinium chloride.

6. 1,1-diethyl-1-(2-benzylideneaminoethyl)hydrazinium chloride.

References Cited in the file of this patent

Chem. Abstracts, vol. 46 (Subject Index), page 13141 (1952).

Chem. Abstracts, vol. 49 (Subject Index), page 1060S (1955).